United States Patent [19]

Means

[11] 4,228,197
[45] Oct. 14, 1980

[54] ATMOSPHERE CONTROLLING METHOD AND APPARATUS FOR FOOD STORAGE

[75] Inventor: John E. Means, Kirkland, Wash.

[73] Assignee: Food Storage Systems, Inc., Yakima, Wash.

[21] Appl. No.: 4,314

[22] Filed: Jan. 18, 1979

Related U.S. Application Data

[63] Continuation-in-part of Ser. No. 811,249, Jun. 29, 1977, abandoned.

[51] Int. Cl.² .............................................. A23K 3/02
[52] U.S. Cl. ................................... 426/419; 426/231; 422/40; 55/59; 55/162; 55/180
[58] Field of Search .................. 426/231, 314, 419; 55/179, 180, 162, 59, 62; 422/40, 116, 190

[56] References Cited

U.S. PATENT DOCUMENTS

| | | |
|---|---|---|
| 3,107,171 | 10/1963 | Robinson .......................... 426/314 X |
| 3,205,049 | 9/1965 | Lunnert et al. ...................... 422/109 |
| 3,313,630 | 4/1967 | Harvey ................................ 426/314 |
| 3,313,631 | 4/1967 | Jensen ............................. 426/419 X |
| 3,368,873 | 2/1968 | Fuller et al. ...................... 422/40 X |
| 3,445,193 | 5/1969 | Lamp, Sr. .......................... 422/116 |

Primary Examiner—Arthur D. Kellogg
Attorney, Agent, or Firm—Robert W. Beach; Ward Brown

[57] ABSTRACT

An adsorber for removing carbon dioxide is connected to a substantially sealed food storage chamber for scrubbing the storage chamber atmosphere. When the adsorber becomes loaded with carbon dioxide, it is connected to an external atmosphere inlet and an external atmosphere outlet for purging the adsorber with fresh air. Previously scrubbed storage chamber air is introduced into the purged adsorber prior to reconnecting it to the storage chamber so that high oxygen content fresh air is not introduced into the storage chamber.

22 Claims, 10 Drawing Figures

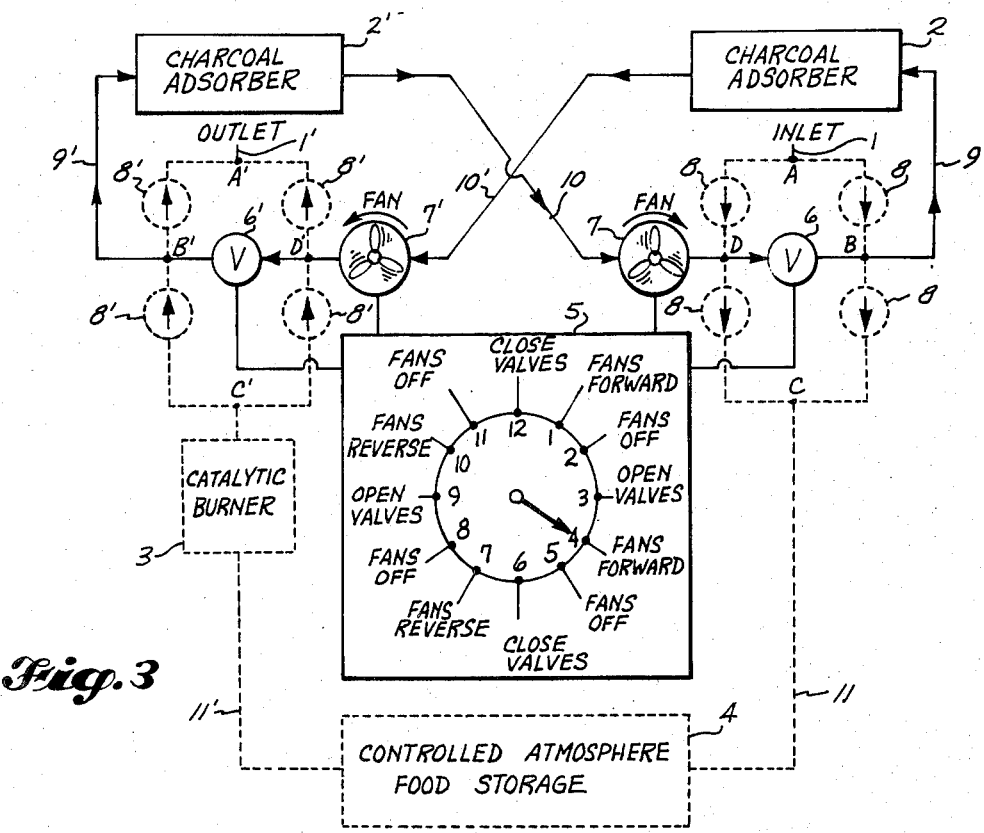
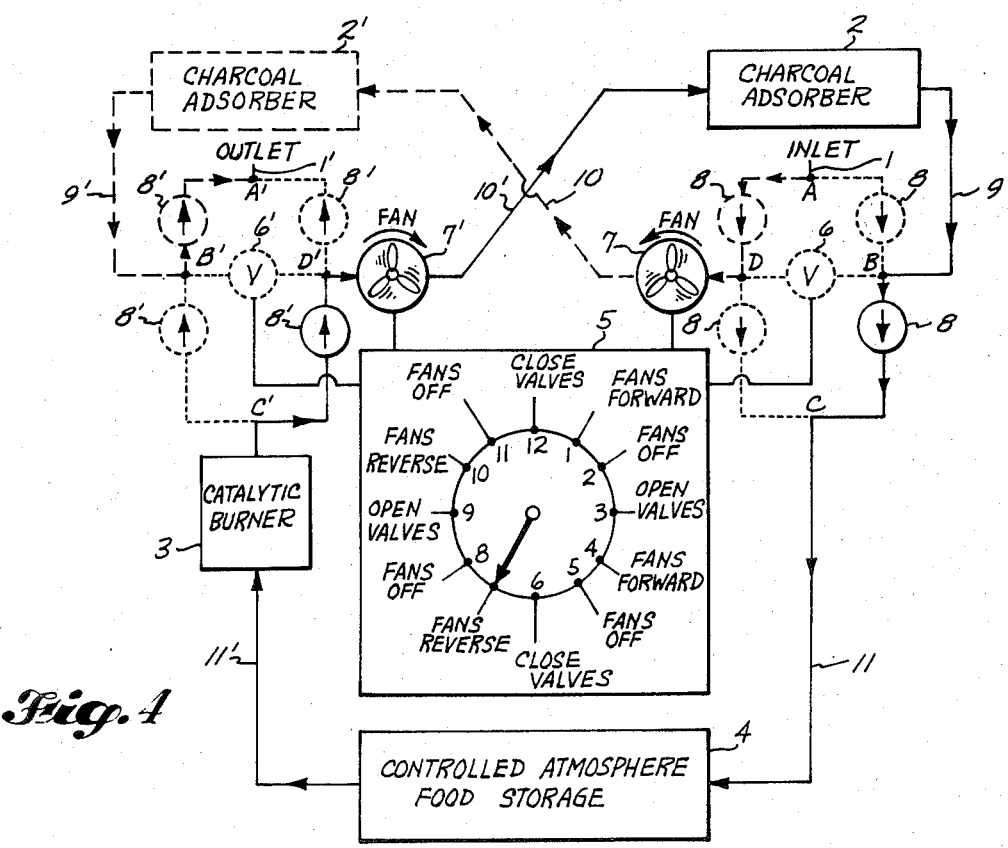

ATMOSPHERE CONTROLLING METHOD AND APPARATUS FOR FOOD STORAGE

CROSS-REFERENCE

This application is a continuation-in-part of U.S. application Ser. No. 811,249, filed June 29, 1977, for Atmosphere Controlling Apparatus and Method for Food Storage now abandoned.

BACKGROUND OF THE INVENTION

1. Field of the Invention

The present invention relates to apparatus and methods for controlling the atmosphere of substantially sealed food storage chambers.

2. Prior Art

It is known that perishable or oxidizable foods may be preserved more effectively for extended periods in storage if the oxygen and carbon dioxide contents of the atmosphere surrounding such foods are maintained at levels below those normally found in the atmosphere. Food storage systems in which substantially sealed storage chambers are interconnected with various types of burners to remove oxygen, including catalytic burners, and various types of scrubbers to remove carbon dioxide, including charcoal adsorbers, are disclosed in British Pat. No. 457,888 and in the following U.S. Pat. Nos.:

Smith—52,650
Lindewald—2,789,059
Bedrosian et al.—3,102,780
Robinson—3,107,171
Harvey, Jr.—3,313,630
Jensen—3,313,631
Burg—3,400,650
Jensen—3,451,782

When charcoal adsorbers become loaded with carbon dioxide and lose their scrubbing effectiveness, carbon dioxide can be purged from them by blowing ambient air through them. A storage system using two adsorbers alternately connected to a substantially sealed storage chamber has been developed. When one of the adsorbers becomes loaded with carbon dioxide removed from air circulated from the storage chamber through it and back to the storage chamber, the other adsorber is connected to the storage chamber to scrub air from the food storage atmosphere while the first adsorber is purged with fresh air. Similarly, when the second adsorber becomes loaded with carbon dioxide, the purged adsorber is reconnected to the storage chamber to scrub additional air from the storage atmosphere while the second adsorber is being purged. The problem with this type of system is that when an adsorber is reconnected to the storage chamber, fresh air in the reconnected adsorber is introduced into the food storage atmosphere which increases the oxygen content of such atmosphere that is available for stored produce to convert to carbon dioxide, thus accelerating aging of the stored produce.

Lamp, Jr. U.S. Pat. No. 3,445,193 discloses a food storage system using a burner, two adsorbers and an unsealed storage area. According to the Lamp, Jr. system, several different circulations of air may be effected. Air may be drawn from an external atmosphere inlet and blown:

(1) through the burner, then through an adsorber and then to an air outlet;
(2) through the burner, then through an adsorber and then to the storage area; or
(3) through the burner and directly to the storage area.

In accordance with the Lamp, Jr. system, high oxygen content and high carbon dioxide content air alternately are introduced into the storage area. When one adsorber is being used the other adsorber is purged with fresh air. However, the Lamp, Jr. patent does not disclose introducing air from a storage area into a purged adsorber to prevent high oxygen content air from being introduced into the food storage area when the purged adsorber is reconnected to the system.

SUMMARY OF THE INVENTION

The principal object of the present invention is to provide an adsorber system for controlled atmosphere food storage in which fresh air will not be introduced into the food storage atmosphere when a purged adsorber is reconnected to the storage chamber.

The foregoing object can be accomplished by introducing storage chamber air into an adsorber which has been purged, prior to reconnecting the adsorber to the storage chamber.

In the preferred embodiment of the invention, the inlet and outlet of an adsorber are connected to the food storage chamber so that storage chamber air is circulated through the adsorber and back to the storage chamber for scrubbing carbon dioxide from such air. Once the adsorber becomes loaded with carbon dioxide, the adsorber inlet is disconnected from the storage chamber and connected to an external atmosphere inlet. Fresh air is introduced into the adsorber to fill it and displace the storage chamber air in the adsorber back into the storage chamber, whereupon the adsorber outlet is disconnected from the storage chamber and connected to an external atmosphere outlet. In this condition, fresh air is circulated through the adsorber to purge it. After the adsorber is purged, the adsorber inlet is disconnected from the external atmosphere inlet and reconnected to the storage chamber. Storage chamber air is introduced into the adsorber until substantially all of the purging fresh air has been exhausted through the adsorber outlet to the external atmosphere, whereupon the adsorber outlet is disconnected from the external atmosphere and reconnected to the storage chamber.

BRIEF DESCRIPTION OF THE DRAWINGS

FIG. 3 is a diagram of the adsorber system of FIG. 1 with the fans and valves effecting the "second phase circulation."

FIG. 4 is a diagram of the adsorber system of FIG. 1 with the fans and valves effecting the "third phase circulation."

DETAILED DESCRIPTION

Figure 1:
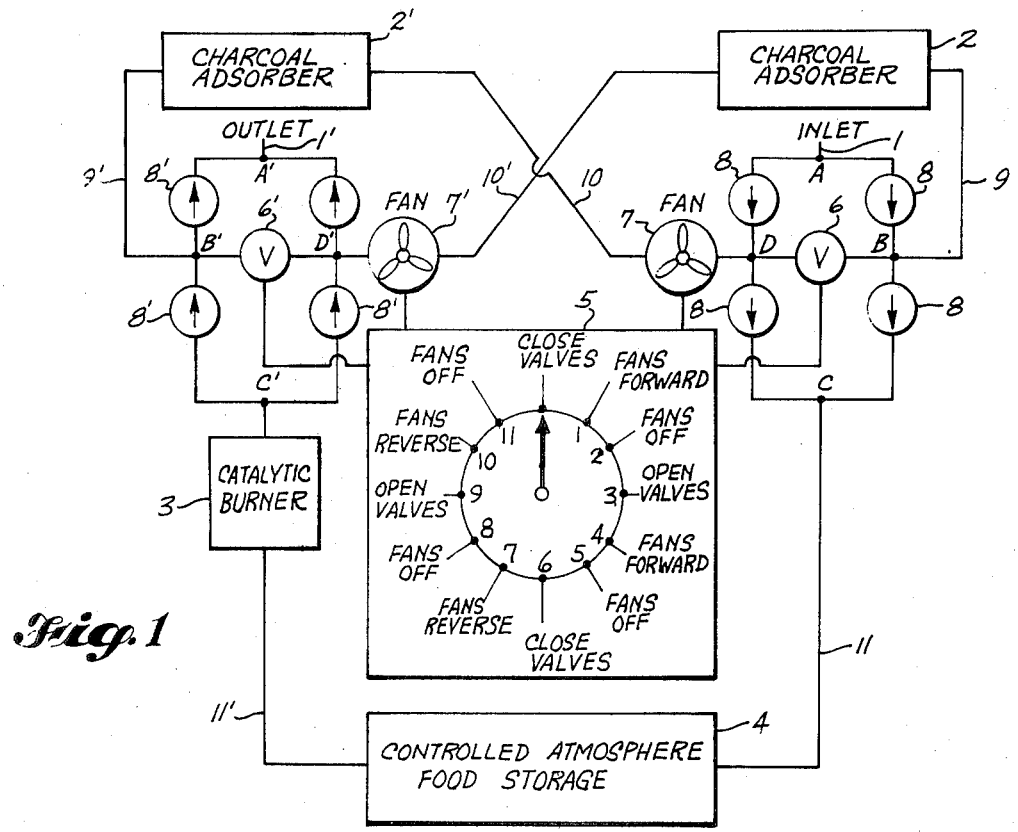
FIG. 1 is a diagram of a dual adsorber system in accordance with the present invention.

As diagramatically shown in FIG. 1, a dual adsorber system in accordance with the present invention includes several conduits interconnecting a fresh air inlet 1 from ambient atmosphere, a purging air outlet 1' to ambient atmosphere, two charcoal adsorbers 2 and 2', a catalytic burner 3 and a substantially sealed storage chamber 4. An automatic timing control system 5 actuates control valves 6 and 6' and reversible fans 7 and 7' to effect consecutively at least three different circulations of air which are further described below.

Fresh air inlet 1 communicates with a tee forming one junction A of a check valve network having three other junctions B, C and D. Junction C is a tee located opposite inlet junction A and junctions B and D are cross junctions interposed between junctions A and C and located opposite one another. Check valves 8 are connected between junctions B and A, and junctions D and A; such two check valves prevent the passage of air out of the fresh air inlet 1. Two other check valves 8 are connected between junctions C and B and junctions C and D to prevent the passage of air out of the storage chamber through the storage chamber inlet conduit 11. Control valve 6 is connected between cross junctions B and D and is operable either to enable free passage of air between the cross junctions or to prevent such passage.

A similar check valve network is provided for purging air outlet 1' including opposite tees A' and C', opposite cross junctions B' and D', and a control valve 6' connected between junctions B' and D'. Two check valves 8' between junctions A' and B' and between junctions A' and D' prevent intake of air through the purging air outlet 1'. Two other check valves 8' between junctions B' and C' and between junctions D' and C' prevent flow of air into chamber 4 through the storage chamber outlet conduit 11'.

The cross junctions of the inlet and outlet check valve networks are connected to the charcoal adsorbers 2 and 2'. A conduit 9 connects inlet cross junction B and adsorber 2. A conduit 9' connects outlet cross junction B' and adsorber 2'. A conduit 10 connects inlet cross junction D and adsorber 2' through reversible fan 7. A conduit 10' connects outlet cross junction D' and adsorber 2 through reversible fan 7'. Fan 7 is operable to draw air from cross junction D and blow such air to adsorber 2' or to draw air from adsorber 2' and blow such air to cross junction D. Similarly, fan 7' is operable to draw air from cross juntion D' and blow such air to adsorber 2 or to draw air from such adsorber and blow such air to junction D'. Conduits 11 and 11' connect inlet and outlet tees C and C', respectively, with the substantially sealed food storage chamber 4. Burner 3 is interposed between outlet tee C' and the storage chamber.

The automatic timing control system 5 sequentially effects the actions indicated by the numbered and labeled clockface shown in the drawings, namely: close valves—fans forward—fans off—open valves—fans forward—fans off—close valves—fans reverse—fans off—open valves—fans reverse—fans off. For the purposes of this specification: "fans forward" means that each fan draws air from its adsorber 2 or 2' and blows such air to its cross junction D or D'; "fans reverse" means that each fan draws air from its cross junction D or D' and blows such air to its adsorber 2 or 2'; "open valves" means that each valve 6 and 6' provides for free passage of air between cross junctions B and D and cross junctions B' and D'; and "close valves" means that each valve is positioned to prevent the passage of air between cross junctions B and D and between cross junctions B' and D'.

Figure 2:
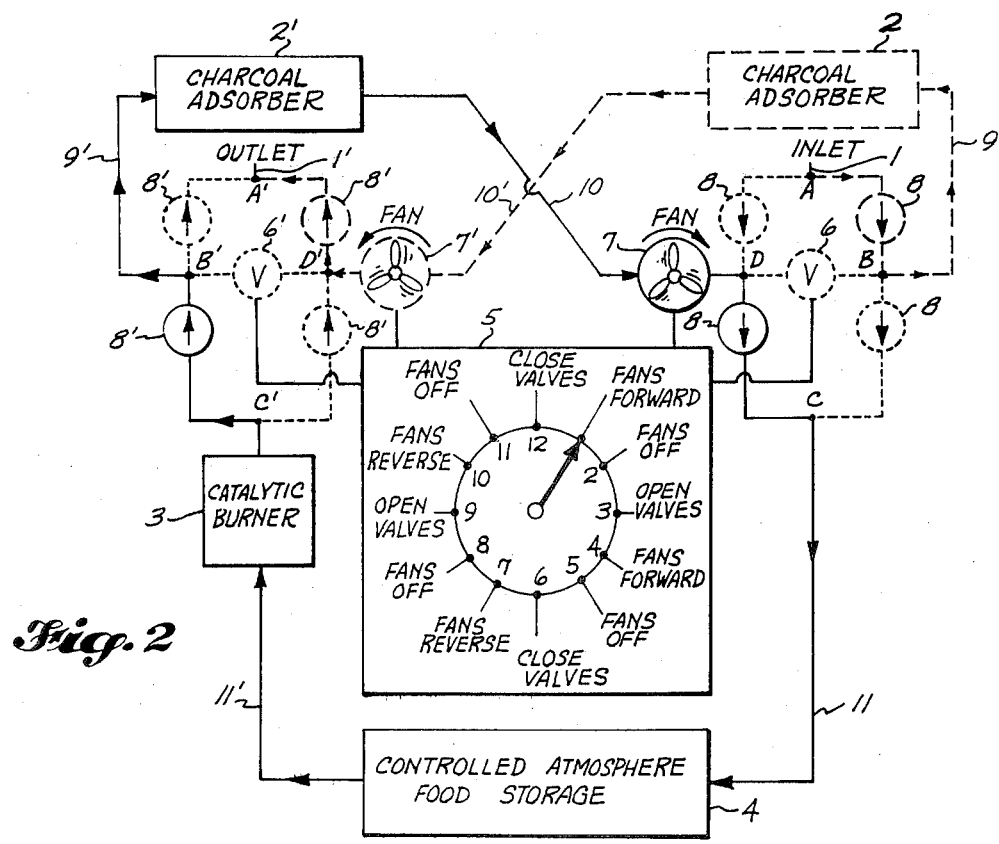
FIG. 2 is a diagram of the adsorber system of FIG. 1 with the fans and valves effecting the "first phase circulation."

A first phase circulation of air is diagrammatically illustrated in FIG. 2 where the automatic timing control system has just moved from position 12, in which valves 6 and 6' were closed, to position 1 in which the fans are actuated to move air in a forward direction as indicated by the arrow over each fan. As shown in solid lines, fan 7 draws air from adsorber 2' which air is supplied to the adsorber from outlet cross junction B'. Because of the check valve between junctions B' and A', air cannot be supplied to cross junction B' from outlet 1' but must be drawn from junction C'. Air cannot be drawn from cross junction D' to junction C' because of the check valve between junctions D' and C'. Consequently, air is drawn from the food storage chamber through the catalytic burner 3 and the check valve between junctions C' and B'.

The air drawn from the storage area through adsorber 2' by fan 7 is blown to inlet cross junction D. Because of the check valve between junctions D and A, such air must pass through the check valve between junctions D and C into the food storage chamber. The check valve between junctions C and B prevents such air from passing to the cross junction B. Consequently, air from the food storage chamber is circulated through the catalytic burner for removing oxygen, through adsorber 2' for removing carbon dioxide and back to the storage chamber.

At the same time, as shown in long dashed lines in FIG. 2, fan 7' draws air from adsorber 2 which air is supplied to that adsorber from inlet cross junction B. Because of the check valve 8 between junctions C and B, air cannot be supplied to cross junction B from the food storage chamber, but must be drawn from the fresh air inlet 1 through the check valve between junctions B and A. Air cannot be drawn from cross junction D to adsorber 2 because of the check valve 8 between junctions D and A. The air drawn from the inlet 1 by fan 7' is blown to outlet cross junction D'. Because of the check valve 8' between junctions D' and C', such air must pass through the check valve between junctions A' and D' to the purging air outlet 1'. Check valve 8' between junctions A' and B' prevents such air from passing on to cross junction B'. Consequently, fan 7' draws air from the fresh air inlet 1, through adsorber 2 and blows it out the fresh air outlet 1' for purging adsorber 2.

This first phase circulation is continued until adsorber 2' becomes loaded with carbon dioxide, perhaps 10 or 15 minutes in a representative installation, whereupon the automatic timing control system quickly switches from position 1 to position 2 to turn the fans off, to position 3 to open the control valves 6 and 6' and to position 4 to reenergize the fans to blow in the forward direction. As shown in solid lines in FIG. 3, each fan draws air directly from an adsorber and blows such air directly to a cross junction D or D'. The fans are "tuned" in that they draw and blow the same amount of air. Consequently, fan 7 blows the same amount of air to cross junction D as is drawn from cross junction B by fan 7'. Such air takes the path of least resistance, namely, through the open valve 6, and no air leaks into the food storage chamber or from the fresh air inlet 1. Similarly, fan 7' blows the same amount of air from adsorber 2 to cross junction D' as is drawn through open valve 6', cross junction B' and adsorber 2' by fan 7. This second phase circulation of air is continued for a short period so that the fresh air in adsorber 2 is exchanged for the scrubbed air in adsorber 2'. In a representative installation, the second phase circulation may be continued for only 10 or 15 seconds.

Once the air in the two adsorbers has been exchanged, the automatic timing control system quickly jumps to position 5 to turn the fans off, then to position 6 to close the valves and then to position 7 to actuate the fans to blow in a reverse direction to effect a third phase circulation shown in FIG. 4. As shown in solid lines, fan 7' draws air from the food storage chamber through the catalytic burner and through the check valve 8' between junctions C' and D'. Such air is blown by fan 7' through adsorber 2, through the check valve between junctions B and C and back to the storage chamber. At the same time, as shown in long dashed lines in FIG. 4, fan 7 draws air from the fresh air inlet 1 through the check valve between junctions D and A and blows such air through adsorber 2', through the check valve between junctions A' and B' and out the fresh air outlet 1'.

Figure 5:
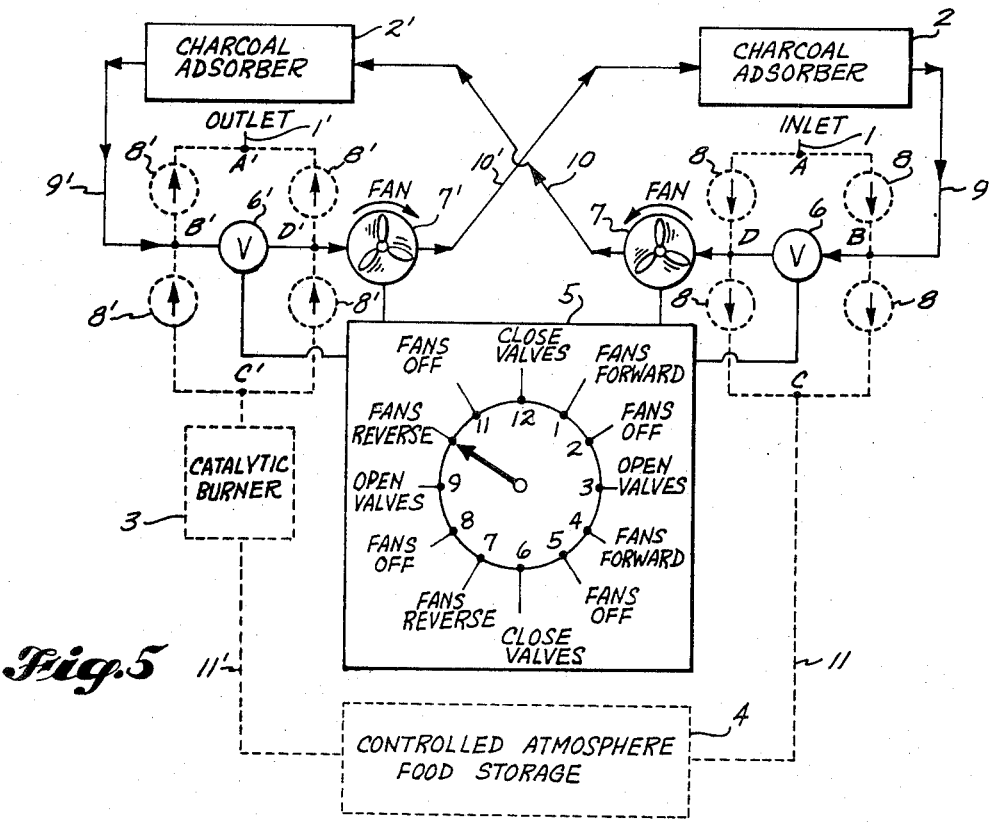
FIG. 5 is a diagram of the adsorber system of FIG. 1 with the fans and valves effecting an alternative second circulation.

The third phase circulation is continued until adsorber 2 is loaded, whereupon it is desirable to repeat the second circulation of FIG. 3 to exchange the fresh air in adsorber 2' for the scrubbing air in adsorber 2. The automatic timing control system jumps quickly to position 8 to turn the fans off, to position 9 to open valves 6 and 6' and to position 10 to energize the fans. As shown in solid lines in FIG. 5, the second phase circulation can be effected by actutating the fans to blow in the reverse direction, as well as by actuating the fans to blow in the forward direction as shown in FIG. 3. In either case, each fan draws air from one adsorber and blows such air to the other adsorber and the fans blow and draw the same amount of air.

Once the air in the two adsorbers has been exchanged, the automatic timing control system jumps quickly to position 11 to turn the fans off, to position 12 to close the valves and to position 1 to actuate the fans to blow in the forward direction to effect the first circulation as shown in FIG. 2.

By sequentially effecting the actions described above, the automatic control system actuates the control valves 6 and 6' and the reversible fans 7 and 7' to effect alternately the first and third phase circulations with a short time delay therebetween so that the air in the food storage chamber is substantially continuously scrubbed. In each of the first and third phase circulations, air is blown through a single inlet conduit 11 to the food storage chamber and an equal amount of air is drawn from such storage area through a single outlet conduit 11' and through a single burner 3. In addition, during the time delay the second phase circulation is effected to exchange fresh air in the adsorber to be next connected to the food storage chamber for storage chamber air so that fresh air never is introduced into the food storage chamber from a purged adsorber.

In the preferred embodiment of the present invention shown in FIGS. 6 through 9, the inlet 15 of a single adsorber 2" is connected by a conduit 16 to a tee 17 through a continuously operating single direction fan 7". An inlet valve network, including two solenoid valves 18 and 19 positioned at opposite sides of tee 17, is operable to admit air to the adsorber either from a fresh air inlet 1, as shown by the arrows in FIGS. 7 and 8, or from a substantially sealed food storage chamber 4, as shown by the arrows in FIGS. 6 and 9. At the outlet side of the adsorber, a conduit 20 connects the adsorber outlet 21 to a tee 22, and an outlet valve network, including two solenoid valves 23 and 24 positioned at opposite sides of tee 22, is operable to convey air from adsorber 2" either to the food storage chamber, as shown by the arrows in FIGS. 6 and 7, or to a fresh air outlet 1', as shown by the arrows in FIGS. 8 and 9. An automatic control system 5' actuates the inlet and outlet valve networks to control the source of air blown to the adsorber inlet by fan 7" and the location to which such air is discharged from the adsorber.

In a representative installation for apple storage the volume of the storage chamber can be about 25,000 cu. ft. (708 cu. m.) and the adsorber can be an activated charcoal adsorber of a volume of about 8 cu. ft. (0.227 cu. m.).

Figure 6:
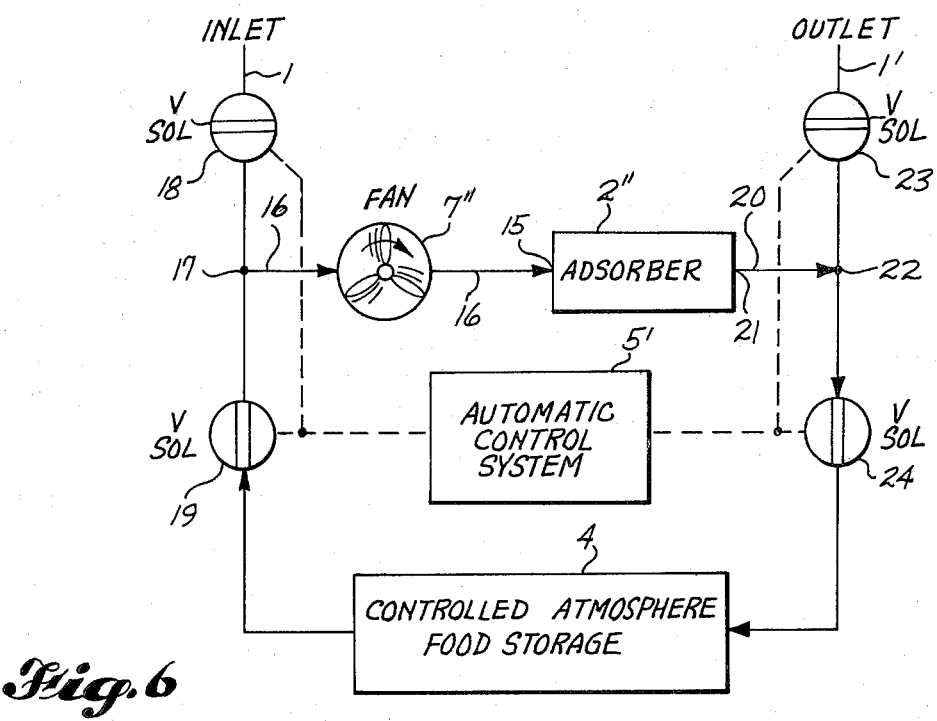
FIG. 6 is a diagram of a single adsorber system in accordance with the present invention.

In accordance with the present invention, in the initial circulation of air, shown diagrammatically in FIG. 6, valves 19 and 24 are opened to connect the adsorber inlet 15 and outlet 21 to the food storage chamber 4, and valves 18 and 23 are closed to disconnect the air inlet 1 and outlet 1' from the rest of the system. Fan 7" circulates air from the storage chamber through the adsorber and back to the storage chamber for scrubbing such air to remove carbon dioxide from it.

Figure 7:
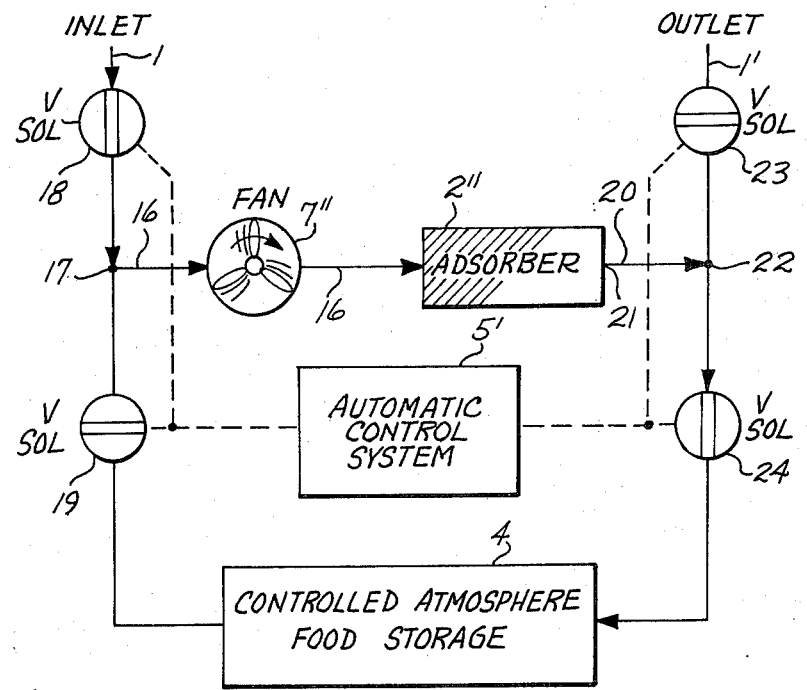
FIGS. 7, 8 and 9 are diagrams of the adsorber system of FIG. 6 with parts in different positions.

Once the adsorber becomes loaded with carbon dioxide, which in a representative installation may take about 10 minutes, the automatic control system 5' actuates the inlet valves 18 and 19 to reverse their positions such that the adsorber inlet 15 is disconnected from the storage chamber by closing of valve 19 and instead connected to the fresh air inlet by opening of valve 18 as shown in FIG. 7. As shown diagrammatically by the cross-hatching in that figure, the fresh air introduced into the adsorber forces the residual storage chamber air remaining in the adsorber into the storage chamber through valve 24. The increase in pressure in the storage chamber due to introducing such residual air from the adsorber into the storage chamber without withdrawing an equal amount of air from the storage chamber is very slight because of the large difference in the volumes of the storage chamber and the adsorber.

Figure 8:
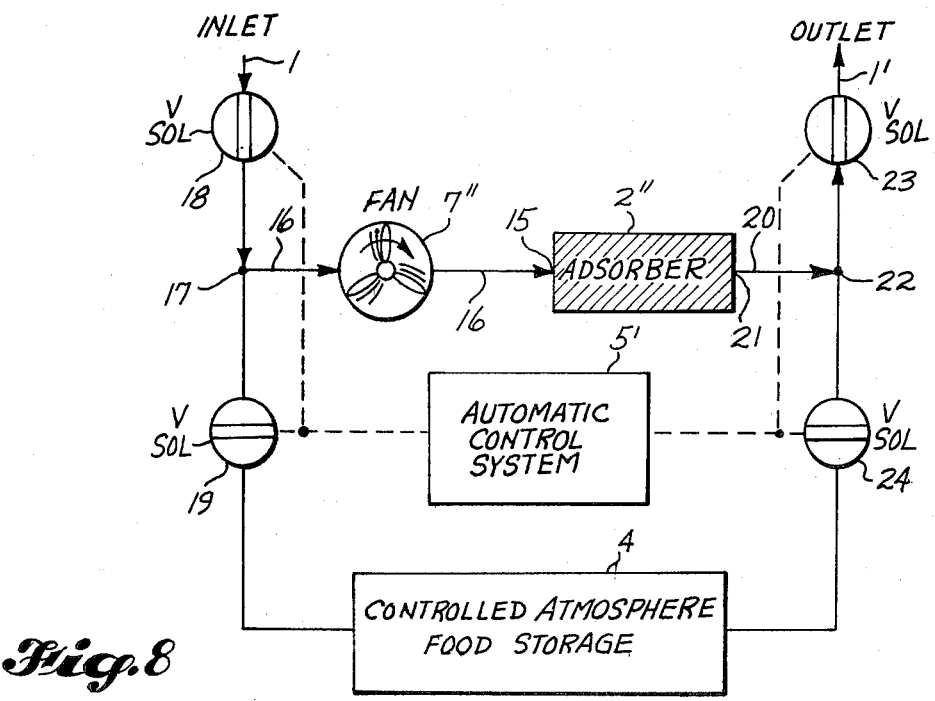

After substantially all of the residual storage chamber air has been returned from the adsorber to the storage chamber, but before fresh air is introduced into the chamber, the automatic control system 5' actuates the outlet valve network to reverse the positions of valves 23 and 24 which disconnects the adsorber outlet conduit 20 from the storage chamber, connecting it instead to the fresh air outlet 1' as shown in FIG. 8. The time delay between the actuation of the inlet valve network to effect the circulation of FIG. 7 and the actuation of the outlet valve network to affect the circulation of FIG. 8 should be substantially identical to the time required for fan 7" to fill the adsorber with fresh air from inlet 1. In a representative installation such time delay could be about 10 seconds. In the condition of FIG. 8 the adsorber is regenerated or purged with fresh air.

Figure 9:
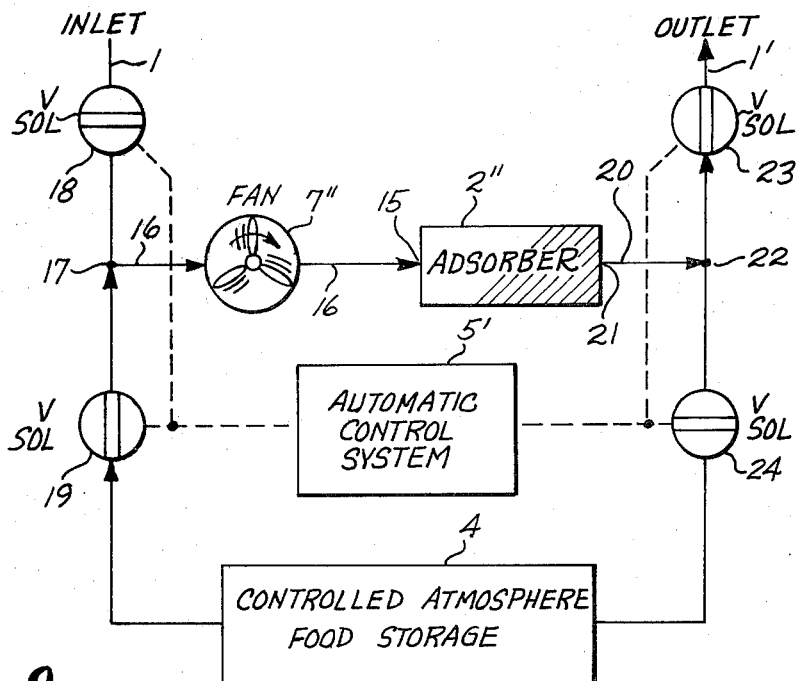

After the adsorber is purged, the inlet valve network is actuated to reverse the positions of valves 18 and 19 which, as shown diagramatically in FIG. 9, reconnects the adsorber inlet 15 to the storage chamber such that fan 7" introduces storage chamber air into the adsorber forcing the purging fresh air out the external atmospheric air outlet 1' instead of being injected into the food storage chamber 4. The condition of FIG. 9 continues only so long as is required to substantially fill the adsorber with storage chamber air, whereupon the outlet valve network is actuated to reconnect the adsorber outlet to the storage chamber as shown in FIG. 1. The decrease in pressure in the storage chamber resulting from withdrawing air from it to the adsorber while fresh air is being discharged from the adsorber to the ambient atmosphere is very small because of the great difference in volume of the adsorber and the food storage chamber.

While the timing of the various valve actuations described above could be controlled by mechanism for sensing the oxygen and/or carbon dioxide content of air present in the adsorber, it is preferred that the automatic control system 5' include automatic timing mechanism for effecting the consecutive valve actuations in predetermined timed relationship. For example, control system 5' actuates the valves to effect the condition of FIG. 6 for one predetermined period, whereupon the condition of FIG. 7 is effected for a different predetermined period, and so on. For a specific application, the average time it takes to load the adsorber, to displace the air in the adsorber and to purge the adsorber can be determined experimentally, and the automatic control system timer can be set accordingly.

Figure 10:
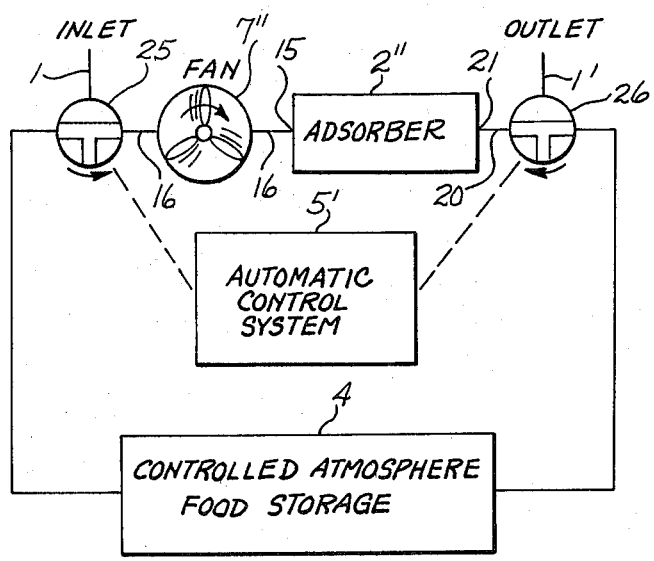
FIG. 10 is a diagram of an alternative embodiment of the single adsorber system of the present invention.

The operation of the alternative embodiment of the present invention shown in FIG. 10 is substantially identical to the operation of the embodiment of FIGS. 6 through 9, the only difference being that a single three-way solenoid valve 25 has been substituted for the inlet valve network including valves 18 and 19, and a single three-way solenoid valve 26 has been substituted for the outlet valve network including valves 23 and 24. In the condition of FIG. 10, the adsorber inlet and outlet 15 and 21 are connected to the storage chamber 4 for scrubbing the storage chamber air. After the adsorber is loaded, valve 25 is actuated to disconnect the adsorber inlet from the storage chamber, introducing fresh air into the adsorber from the atmosphere air inlet 1; after the adsorber is substantially full of fresh air, outlet valve 26 is actuated to disconnect the adsorber outlet from the storage chamber and discharge fresh air out the fresh air outlet 1'; after the adsorber has been purged with fresh air, valve 25 is actuated to reconnect the adsorber inlet to the storage chamber; and after the adsorber is full of storage chamber air, valve 26 is actuated to connect the adsorber outlet to the storage chamber which returns the system to the condition of FIG. 10.

In both embodiments of the present invention, high oxygen content fresh air never is conveyed to the storage chamber because storage chamber air always is introduced into a purged adsorber before its outlet is reconnected to the storage chamber. Similarly, storage chamber air never is exhausted out the external atmospheric air outlet because fresh air is introduced into a loaded adsorber before its outlet is connected to the external atmospheric air outlet.

For apple storage, for example, storage chamber air usually contains about two percent oxygen and three percent carbon dioxide when supplied to the scrubber for removal of carbon dioxide, and about two percent oxygen and one percent carbon dioxide when discharged from the adsorber after being scrubbed.

I claim:

1. The method of controlling the atmosphere in a substantially sealed food storage chamber which comprises, in sequence:
    circulating air from the food storage chamber through an adsorber and back to the food storage chamber for scrubbing carbon dioxide from the food storage chamber air;
    circulating external atmospheric air through the adsorber for purging carbon dioxide from the adsorber;
    displacing external atmospheric air in the adsorber with air from the food storage chamber without introducing such external atmospheric air into the food storage chamber; and
    again circulating air from the food storage chamber through the adsorber and back to the food storage chamber for scrubbing carbon dioxide from the food storage chamber air.

2. The method defined in claim 1, including displacing external atmospheric air in the adsorber for a predetermined period with air from the food storage chamber without introducing such external atmospheric air into the food storage chamber.

3. The method of controlling the atmosphere in a substantially sealed food storage chamber which comprises effecting the following numbered steps in sequence:
    (1) connecting the inlet and outlet of an adsorber to the food storage chamber and circulating air from such chamber through the adsorber and back to such chamber for scrubbing carbon dioxide from such storage chamber air;
    (2) disconnecting the adsorber inlet and outlet from the food storage chamber, connecting such inlet and outlet, respectively, to an external atmosphere inlet and an external atmosphere outlet and circulating external atmospheric air through the adsorber for purging carbon dioxide from the adsorber;
    (3) disconnecting the adsorber inlet from the external atmosphere inlet, connecting the adsorber inlet to the food storage chamber and introducing air from the food storage chamber into the adsorber; and
    (4) disconnecting the adsorber outlet from the external atmosphere outlet, connecting the adsorber outlet to the food storage chamber and again circulating air from such chamber through the adsorber and back to such chamber for scrubbing carbon dioxide from such storage chamber air.

4. The method defined in claim 3, including performing step (2) by effecting the following two steps in sequence:
    (2) (a) disconnecting the adsorber inlet from the food storage chamber, connecting the adsorber inlet to the external atmosphere inlet and introducing external atmospheric air into the adsorber; and
    (2) (b) disconnecting the adsorber outlet from the food storage chamber, connecting the adsorber outlet to the external atmosphere outlet and circulating external atmospheric air through the adsorber for purging carbon dioxide from the adsorber.

5. The method defined in claim 4, including performing step (2) (a) until the adsorber is substantially full of external atmospheric air.

6. The method defined in claim 3 or 4, including performing step (3) until the adsorber is substantially full of storage chamber air.

7. The method of controlling the atmosphere in a substantially sealed food storage chamber which comprises effecting the following numbered steps in sequence:

(1) connecting the inlet and outlet of an adsorber to the food storage chamber and circulating air from such chamber through the adsorber and back to such chamber from scrubbing carbon dioxide from such storage chamber air;

(2) disconnecting the adsorber inlet from such chamber, connecting such inlet to an external atmosphere inlet and introducing external atmospheric air into the adsorber for displacing scrubbed storage chamber air from the adsorber and returning such scrubbed storage chamber air to the food storage chamber;

(3) disconnecting the adsorber outlet from the food storage chamber, connecting such outlet to an external atmosphere outlet and circulating external atmospheric air through the adsorber for purging carbon dioxide from the adsorber; and (4) disconnecting the adsorber inlet and outlet, respectively, from the external atmosphere inlet and the external atmosphere outlet, connecting the adsorber inlet and outlet to the food storage chamber and again circulating air from such chamber through the adsorber and back to such chamber for scrubbing carbon dioxide from such storage chamber air.

8. The method defined in claim 7, including performing step (2) until the adsorber is substantially full of external atmospheric air for displacing substantially all of the scrubbed storage chamber air from the adsorber.

9. The method of controlling the atmosphere in a substantially sealed food storage chamber which comprises, in sequence:

(1) for a first predetermined period, removing air from the food storage chamber, passing such air through an adsorber for scrubbing carbon dioxide from such air and returning such scrubbed air to the food storage chamber;

(2) for a second predetermined period, circulating external atmospheric air through the adsorber for purging carbon dioxide from the adsorber;

(3) for a third predetermined period, introducing air from the food storage chamber into the purged adsorber for displacing external atmospheric air therefrom, without introducing external atmospheric air into the food storage chamber; and (4) for the first predetermined period, again removing air from the food storage chamber, passing such air through the adsorber for scrubbing carbon dioxide from such air and returning such scrubbed air to the food storage chamber.

10. The method of controlling the atmosphere in a substantially sealed food storage chamber which comprises, in sequence:

(1) circulating air from the food storage chamber through a first adsorber and back to the food storage chamber for scrubbing carbon dioxide from the food storage chamber air while circulating external atmospheric air through a second adsorber for purging carbon dioxide from the second adsorber;

(2) transferring air from the first adsorber to the second adsorber for introducing scrubbed storage chamber air from the first adsorber into the second adsorber and for displacing external atmospheric air from the second adsorber with scrubbed storage chamber air from the first adsorber without introducing such external atmospheric air into the food storage chamber; and (3) circulating air from the food storage chamber through the second adsorber and back to the food storage chamber for scrubbing carbon dioxide from the food storage chamber air while circulating external atmospheric air through the first adsorber for purging carbon dioxide from the first adsorber.

11. In atmosphere controlling apparatus for a food storage system including:

a substantially sealed storage chamber for storing food;

first adsorber means for scrubbing carbon dioxide from air passed therethrough;

second adsorber means for scrubbing carbon dioxide from air passed therethrough;

an external atmosphere inlet;

an external atmosphere outlet; and conduit means interconnecting the storage chamber, the first and second adsorber means, the external atmosphere inlet and the external atmosphere outlet;

the improvement comprising circulating means for automatically and sequentially effecting at least the following three circulations of air through the conduit means:

(1) a first circulation in which purging atmospheric air passes from the external atmosphere inlet through the first adsorber means and out the external atmosphere outlet for purging carbon dioxide from the first adsorber means and storage chamber air is circulated from the storage chamber through the second adsorber means and back to the storage chamber for scrubbing carbon dioxide from such storage chamber air;

(2) a second circulation in which air is transferred from the second adsorber means to the first adsorber means such that scrubbed storage chamber air from the second adsorber means is introduced into the first adsorber means and purging atmospheric air in the first adsorber means is displaced from the first adsorber means without being introduced into the storage chamber; and (3) a third circulation in which purging air passes from the external atmosphere inlet through the second adsorber means and out the external atmosphere outlet for purging carbon dioxide from the second adsorber means and storage chamber air is circulated from the storage chamber through the first adsorber means and back to the storage chamber for scrubbing carbon dioxide from such storage chamber air.

12. In the apparatus defined in claim 11, in which the circulating means includes means for circulating air from the first adsorber means to the second adsorber means and back to the first adsorber means for exchanging substantially all the air between the first and second adsorber means during the second circulation.

13. In the apparatus defined in claim 11, in which the circulating means includes an inlet check valve network for preventing the passage of air out through the external atmosphere inlet and an outlet check valve network for preventing the passage of air in through the external atmosphere outlet.

14. In the apparatus defined in claim 13, in which the circulating means further includes a first reversible fan connected to the first adsorber means by the conduit means and operable to blow air to the first adsorber means or draw air from the first adsorber means, a second reversible fan connected to the second adsorber means by the conduit means and operable to blow air to the second adsorber means or draw air from the second adsorber means, and the control means includes means for actuating both fans for blowing in a forward direction to draw air from the adsorber means for effecting the first circulation and in a reverse direction to blow air to the adsorber means for effecting the third circulation.

15. In the apparatus defined in claim 14, in which the circulating means further includes two control valves operable between open positions for effecting the second circulation and closed positions for effecting the first circulation when the fan actuating means actuates the fans to blow in the forward direction, the third circulation being effected by the circulating means when said valves are closed and the fan actuating means actuate the fans to blow in the reverse direction.

16. In the apparatus defined in claim 15, in which each of the inlet and outlet check valve networks is a four junction network including opposite tees A and C and opposite cross junctions B and D interposed between junctions A and C, and including at least four check valves connected, respectively, between junctions B and A, junctions C and B, junctions C and D and junctions D and A, one of the control valves being connected between junctions B and D of one of the networks and the other control valve being connected between junctions B and D of the other network.

17. In the apparatus defined in claim 16, in which one tee of one check valve network communicates with the external atmosphere inlet, one tee of the other check valve network communicates with the external atmosphere outlet, and each of the other network tees is connected to the food storage chamber.

18. In the apparatus defined in claim 17, in which the conduit means connected one cross junction of each check valve network to the first adsorber means and connects the other cross junction of each check valve network to the second adsorber means.

19. In the apparatus defined in claim 18, in which one of the fans is interpoed between one cross junction of the inlet check valve network and the second adsorber means, and the other fan is interposed between one cross junction of the outlet check valve network and the first adsorber means.

20. In the apparatus defined in claim 15, in which the control means includes means for actuating the following actions consecutively: close valves, fans forward, open valves, close valves, fans reverse, open valves.

21. The method defined in claim 1 or 2, including displacing external atmospheric air in the adsorber with air from the food storage chamber until the adsorber is substantially full of food storage chamber air.

22. In atmosphere-controlling apparatus including a substantially sealed food storage chamber, an adsorber for scrubbing carbon dioxide from air passed therethrough and control means for alternately performing the following two specified functions:
   (1) circulating air from the food storage chamber through the adsorber and back to the food storage chamber for scrubbing carbon dioxide from the food storage chamber air; and
   (2) circulating external atmospheric air through the adsorber for purging carbon dioxide from the adsorber;

the improvement comprising the control means including means for automatically performing the following specified function after performing function (2) but before performing function (1):
   (3) displacing external atmospheric air in the adsorber with air from the food storage chamber without introducing such external atmospheric air into the food storage chamber.

* * * * *

UNITED STATES PATENT AND TRADEMARK OFFICE
CERTIFICATE OF CORRECTION

PATENT NO. :  4,228,197
DATED      :  October 14, 1980
INVENTOR(S) :  John E. Means It is certified that error appears in the above-identified patent and that said Letters Patent are hereby corrected as shown below:

Column 9, line 4, cancel "from" after "chamber" and insert ---for---.

Column 11, line 37, cancel "connected" and insert ---connects---.

Column 12, line 4, cancel "interpoed" and insert ---interposed---.

Signed and Sealed this

Sixth Day of January 1981

[SEAL]

Attest:

SIDNEY A. DIAMOND

Attesting Officer

Commissioner of Patents and Trademarks